United States Patent [19]
Mori et al.

[11] 3,953,969
[45] May 4, 1976

[54] SYSTEM FOR PURIFYING EXHAUST GAS OF A SPARK IGNITION TYPE FOUR STROKE INTERNAL COMBUSTION ENGINE

[75] Inventors: Haruo Mori, Tokyo; Yukio Mizuno, Tachikawa, both of Japan

[73] Assignee: Fuji Heavy Industries, Ltd., Tokyo, Japan

[22] Filed: May 1, 1974

[21] Appl. No.: 465,946

Related U.S. Application Data
[63] Continuation-in-part of Ser. No. 259,522, June 5, 1972, abandoned.

[30] Foreign Application Priority Data
June 5, 1971  Japan.................................. 46-39543

[52] U.S. Cl.................................. 60/293; 60/305; 123/75 E; 123/90.1; 123/119 A
[51] Int. Cl.²........................................ F02B 75/10
[58] Field of Search............. 60/293, 305; 123/75 E, 123/119 A, 90.6, 90.1, 90.15, 90.16, 90.17, 90.18

[56] References Cited
UNITED STATES PATENTS

| | | |
|---|---|---|
| 3,334,618 | 8/1967 | Funiciello .......................... 123/90.1 |
| 3,413,965 | 12/1968 | Gavasso ........................... 123/90.16 |
| 3,494,336 | 2/1970 | Myers .............................. 123/90.15 |
| 3,507,261 | 4/1970 | Myers .............................. 123/119 A |
| 3,653,212 | 4/1972 | Gast ..................................... 60/293 |
| 3,662,541 | 5/1972 | Sawada ................................ 60/293 |
| 3,714,932 | 2/1973 | Meacham ....................... 123/119 A |

OTHER PUBLICATIONS
Taylor, C. F., The Internal Combustion Engine In Theory and Practice, (Vol. 1), MIT—Wiley, N. Y., 1960, pp. 190–191.

*Primary Examiner*—Douglas Hart
*Attorney, Agent, or Firm*—Sughrue, Rothwell, Mion, Zinn & Macpeak

[57] ABSTRACT

The valve-overlapping period of a spark ignition type, four stroke internal combustion engine extends within the range of 60° to 90° of crank angle with the valve overlapping period being generally equally divided to each side of the piston top dead center so that the pressure differential between the exhaust gas passage of the engine and the fuel and air intake passage causes the exhaust gas to counterflow from the exhaust gas passage to the combustion chamber and into the intake passage of the engine with the suction effect of piston descent being negligible when the piston is in the vicinity of top dead center. Secondary air supplied to the exhaust gas passage of the engine when the pressure in the exhaust gas passage is lower than atmospheric pressure during the valve-overlapping period causes the secondary air and exhaust gas mixture to mix with the fresh air and fuel mixture in the intake passage to preheat the fresh air and fuel mixture and subsequent recombustion within the combustion chamber of the engine together with the fresh mixture of fuel and primary air.

2 Claims, 5 Drawing Figures

SYSTEM FOR PURIFYING EXHAUST GAS OF A SPARK IGNITION TYPE FOUR STROKE INTERNAL COMBUSTION ENGINE

This application is a continuation in part application of application Ser. No. 259,522 filed June 5, 1972, now abandoned, entitled "A DEVICE FOR PURIFYING EXHAUST GAS OF SPARK IGNITION TYPE FOUR STROKE INTERNAL COMBUSTION ENGINE".

BACKGROUND OF THE INVENTION

1. Field of the Invention

This invention relates to a system for purifying the exhaust gas of a spark ignition type, four stroke internal combustion engine, and more particularly, to a system for supplying secondary air into the exhaust gas passage for counterflow into the intake passage to improve the primary combustion of the engine.

2. Description of the Prior Art

Heretofore, there have been proposed various types of exhaust gas purifying devices for engines, but most of them have an air pump as the means for supplying secondary air into the exhaust gas passage near the exhaust valve. These devices have many disadvantages:
1. They are expensive.
2. They constitute a complicated structure.
3. Through it is not always necessary to supply much secondary air in the high speed operation of the engine, much secondary air may be supplied, since a volume type air pump is normally used.
4. As they are bulky, it is difficult to connect them to the engine.

The present invention contemplates the elimination of the aforementioned disadvantages of the conventional devices or systems and provides a novel and improved system for reducing the injurious components of exhaust gas of a spark ignition type, four stroke, internal combustion engine.

It is, therefore, an object of the invention to provide a system for purifying exhaust gas of a spark ignition type four stroke internal combustion engine which is simply constructed and eliminates the use of an air pump.

It is another object of the present invention to provide a system for purifying the exhaust gas of the engine which is characterized by supplying large volumes of secondary air particularly at low speed and low load operation, where the requirements are high for such secondary air.

It is a further object of the present invention to provide a system for purifying the exhaust gas of an engine which is compact and easily incorporated with existing engines.

SUMMARY OF THE INVENTION

In general, the internal pressure of the exhaust gas passage is positive, but by extending the valve-overlapping period of the engine when both the air intake and gas exhaust valves are opened at the same time by operation of means for extending the valve-overlapping period such as by cam means, and while the piston is approaching top dead center position and descending therefrom, the pressure in the exhaust gas passage becomes negative due to the fact that the negative pressure in the air intake passage acts directly on the exhaust gas passage during such valve-overlapping period. Therefore, it is a feature of the present invention to supply the secondary air to the exhaust gas passage, particularly to the neighborhood of the exhaust gas port of the passage, during the valve-overlapping period, which is generally equally divided to each side of the piston top dead center position to cause the exhaust gas and secondary air mixture to counterflow through the combustion chamber and into the air intake passage for mixing with the fresh air and fuel mixture for preheating of the same prior to preheated fresh air and fuel mixture being sucked into the combustion chamber during descent of the piston.

The secondary air supply means constitutes a nozzle or an opening within the exhaust gas passage with an air conduit pipe connected to the nozzle or opening through the check valve and the other end opening to the clean air side of an air cleaner of the engine and acting as a secondary air inlet port. Cam means may be provided for extending the valve-overlapping period of the engine.

These and other objects, features and advantages of the present invention will become apparent from the following description taken in conjunction with the accompanying drawings.

DESCRIPTION OF THE PREFERRED EMBODIMENT

Figure 1:
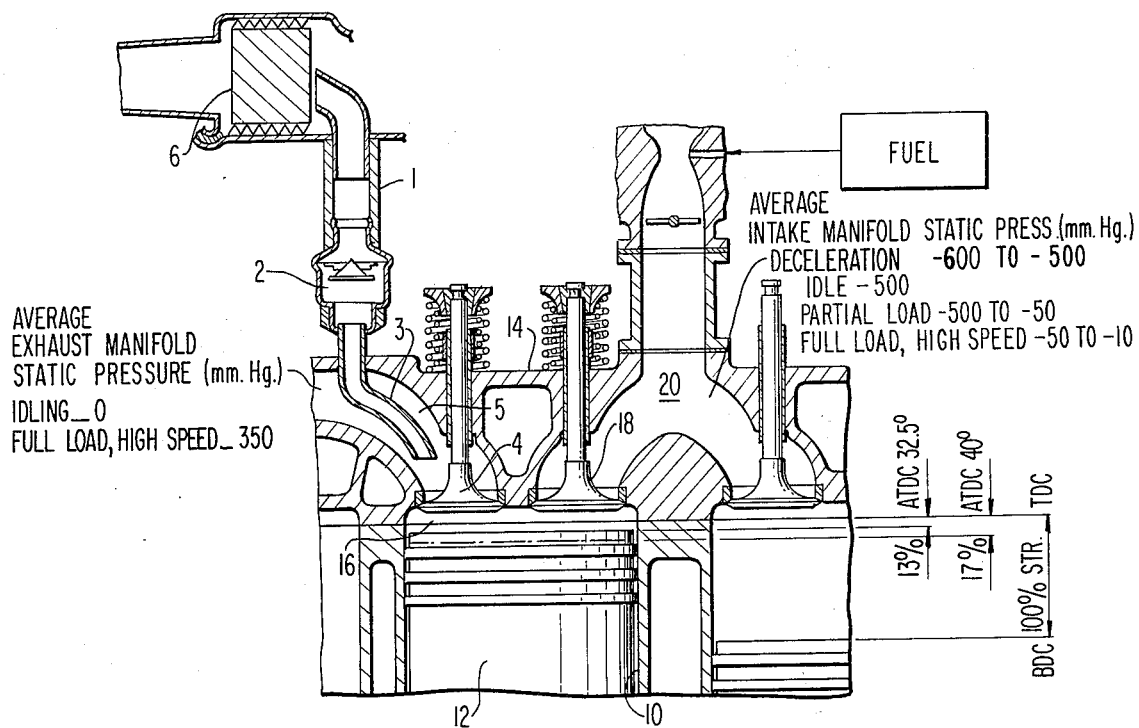
FIG. 1 is a sectional view of one embodiment of the system according to the present invention.

Reference is now made to the drawings, particularly to FIG. 1, which shows one embodiment of the system of the present invention. An internal combustion engine which is of the spark ignition, four stroke type, may consist of two or more cylinders such as 10 which carries a reciprocating piston 12 which reciprocates between a top dead center position and a bottom dead center position as shown, with the head 14, the reciprocating piston 12 and the stationary cylinder 10 defining a combustion chamber 16 of variable volume. The engine is provided with an intake valve 18 and exhaust valve 4 which opens up to cylinder 10, and are positioned respectively within an intake manifold or passage 20 and an exhaust manifold or passage 5 with the engine operating such that the average static pressure within the exhaust manifold 5 ranges from 0 to 350 mm. Hg and being essentially 0 during idling condition. In like respect, the average static pressure within the intake manifold varies depending upon operating conditions of the engine, but during vehicle deceleration a vacuum pressure within the intake manifold may reach −600 mm. Hg, while during idle and partial manifold may vary between −600 mm. Hg and −500 mm. Hg, while during idle conditions, the average static pressure may be approximately −500 mm. Hg, at partial load, the average static pressure may be from −500 mm. Hg to −50 mm. Hg, while under full load conditions the average static pressure may be −10 mm. Hg to −50 mm. Hg. With respect to the exhaust passage 5, this passage is supplied with a nozzle 3 for supplying secondary air to the exhaust passage 5 adjacent the exhaust valve 4, this air being supplied from an air cleaner 6. A conduit or pipe 1 provides a secondary air inlet port opening to the clean side of an air cleaner for the engine with the secondary air being discharged through nozzle 3 after passage through a check valve 2.

Figure 2:
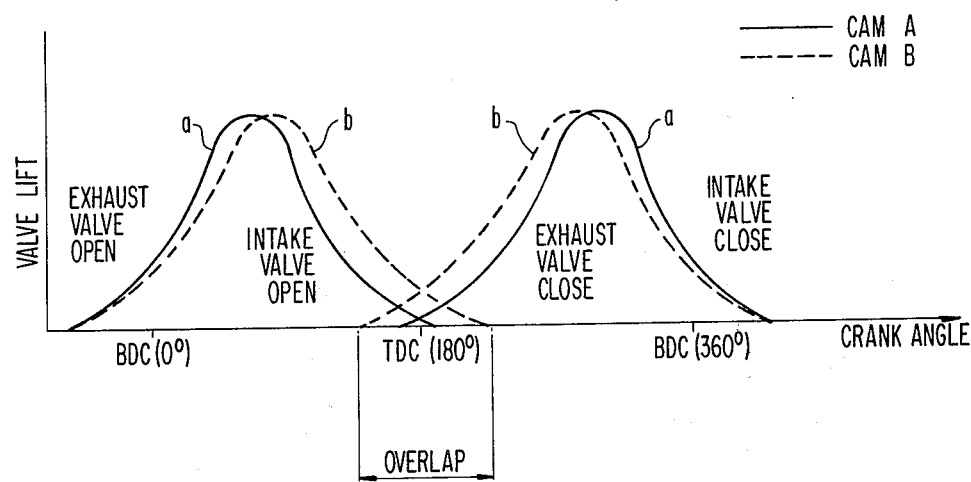
FIG. 2 is a graphic representation of valve lift curves of the spark ignition type four stroke internal combustion engine comparing the present system with a conventional system.

Reference is now made to FIG. 2, which shows a graph of the valve lift curves by the action of cam means for lifting the air intake and gas exhaust valves 18 and 4 of the engine of FIG. 1. As is clear from FIG. 2, the curve a is a valve lift curve for a normal engine having cam means which provide an ordinary, short valve-overlapping period as provided by cam A. Curve b shows a valve lift curve for an engine having the system of the present invention in which a considerably long valve-overlapping period of approximately 80° crank angle is shown being equally divided to each side of top dead center position for the piston 12, that is, 40° before top dead center and 40° after top dead center, the extended valve-overlapping period being provided by operation of cam B. Regardless of the pressure differential existing between the exhaust manifold and the intake manifold, under normal engine operation, secondary air is almost never supplied to the exhaust gas passage, since the time period is so short that the effect of the pressure differential cannot be effectively felt within the exhaust manifold 5. The present invention is directed to the employment of a cam such as cam B to provide the engine with a considerably long valve-overlapping period and one which is equally divided to each side of piston top dead center, and wherein the effect of piston suction during its descent is such that it will materially effect the desired counterflow of exhaust gas and secondary air from the exhaust manifold 5 into the intake manifold 20 for mixing with the incoming fresh air and fuel mixture for preheating that mixture prior to recombustion of the exhaust gas counterflowed to the intake manifold along with the secondary air during subsequent combustion within combustion chamber 16 after compression by piston 12.

It is generally believed that the pressure in the exhaust gas passage of the engine is positive and that is correct under normal engine operation having an ordinary short valve-overlapping period. However, in an engine having a considerably long valve-overlapping period equally divided to each side of top dead center, the pressure becomes negative within the exhaust gas passage during the valve-overlapping period by nature of the negative pressure within the intake manifold particularly during vehicle deceleration, idling and partial load conditions and being unaffected by piston suction, since the piston is near the top dead center position and because of the length of the valve-overlapping period, so as to permit the higher pressure exhaust gas and secondary air to rush across the top of piston 12, through the combustion chamber 16 and into the intake manifold 20.

Figure 3:
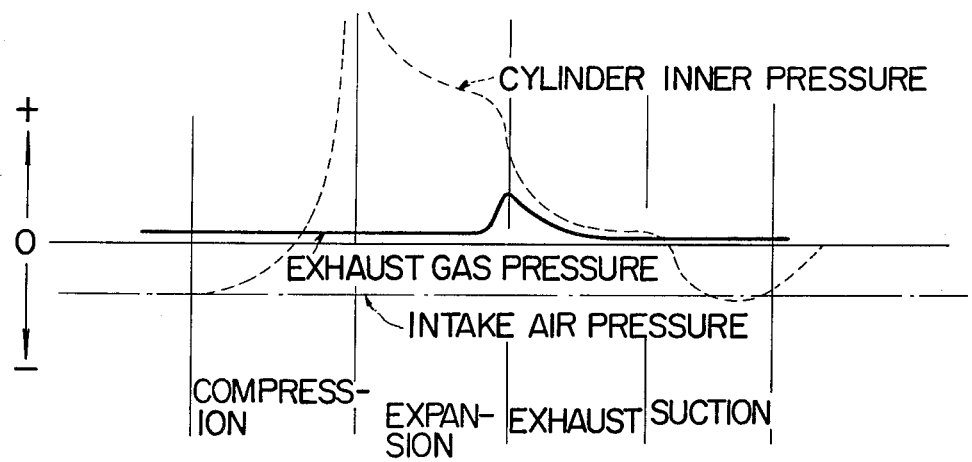
FIG. 3 is a pressure diagram of the normal engine.

Reference is now made to FIG. 3, which shows the pressure diagram of the normal engine.

The pressure in the air intake passage or manifold 20 is generally negative when the engine is under operation; to the contrary, the pressure in the exhaust gas passage is positive and the pressure is particularly raised or increased when the exhaust valve is open, because the high pressure gas flows from the combustion chamber by movement of the piston towards top dead center and by its own high pressure into the exhaust passage or manifold 5. Since the valve-overlapping period of the normal engine is relatively short, at the end of the exhaust stroke even with some valve overlap, the exhaust gas pressure remains positive and is not appreciably affected by the air intake pressure, which is shown as being negative and relatively constant. Accordingly, the pressure within the exhaust passage does not become negative, and it is difficult to supply secondary air into the exhaust gas passage during this period of valve-overlap without the use of an air pump.

Figure 4:
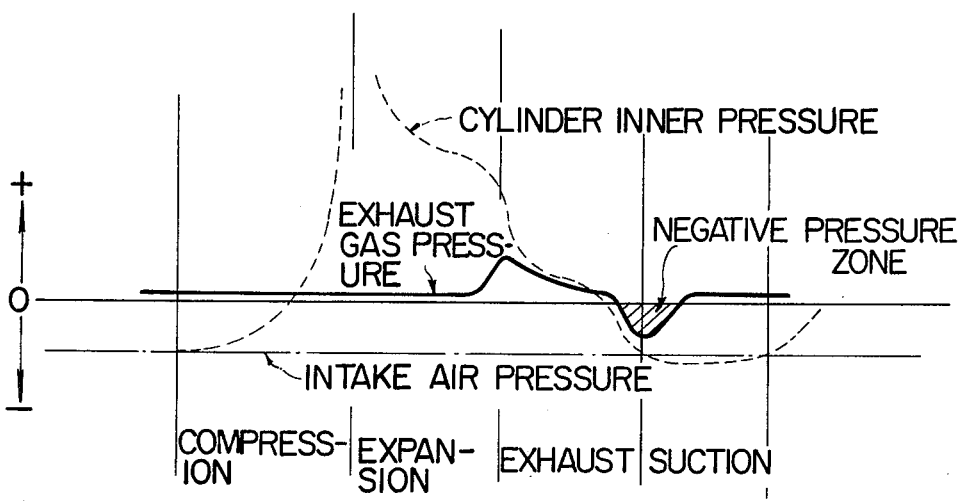
FIG. 4 is a pressure diagram of the engine having a considerably long valve-overlapping period for the present invention.
Figure 5:
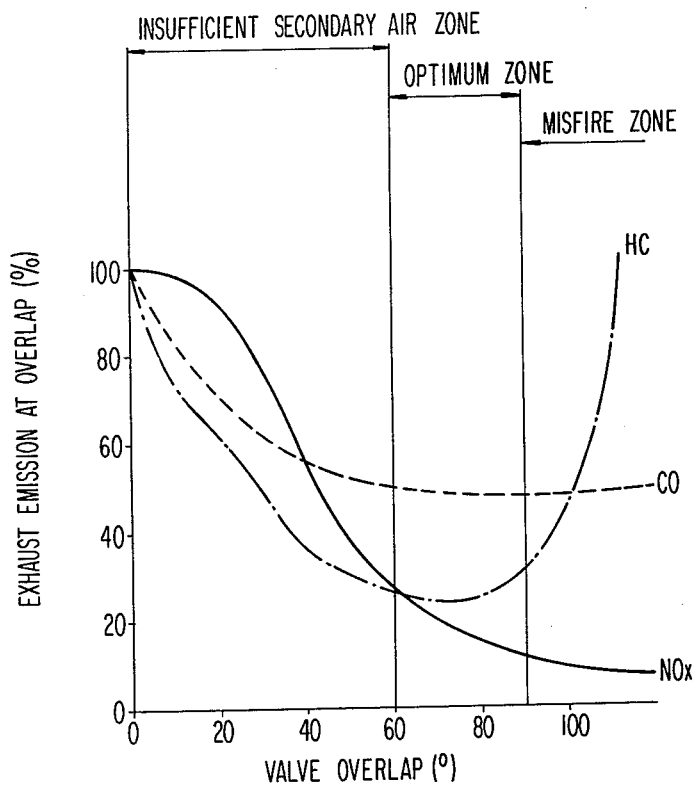
FIG. 5 is a plot of exhaust emission against valve overlap for the control system of the present invention.

Reference is now made to FIG. 4, which shows the pressure diagram for an engine equipped with the emission control system of the present invention which has a considerably long valve-overlapping period generally evenly divided to each side of the piston top dead center position; when the piston is moving upwardly during the exhaust stroke and subsequently moving downwardly during the suction stroke, the engine being identical to that of the prior art device of FIG. 3 other than the employment of a secondary air source adjacent the exhaust valve 4 and the duration and timing of the valve-overlap period. However, since the overlap period for the exhaust and intake valve is long, within the range of 60° to 90°, preferably at about 80° and generally equally divided to each side of the piston top dead center for the piston exhaust and suction stroke, the exhaust gas pressure within the exhaust manifold becomes negative by the effect of the direct fluid connection to the air intake passage or manifold 20, the check valve 2 opening permitting secondary flow to enter the exhaust manifold 5 and to counterflow into the intake manifold 20 during the time that the piston is approaching top dead center position and descending slightly therefrom. By reference to FIG. 1, the percentage of piston stroke for a crank movement of 40° from before top dead center to after top dead center or from top dead center to after top dead center is aproximately 17 per cent which means that the suction effect after top dead center for a 40° crank rotation is relatively small since the piston has moved only 17 per cent of its full stroke. Obviously, the suction effect of the piston 12 is much greater when the piston is moving faster and occurs substantially after the 40° after top dead center position, at which point the valve-overlap period ceases. The effect of movement of piston 12 is therefore negligible and the counterflow of the exhaust gas with the secondary air from the exhaust manifold 5 into the intake manifold 20 readily occurs without detrimental effect of movement of piston 12, and the preheating of the fresh air and fuel mixture within the intake manifold 20 results in a decrease in exhaust emission whose effectiveness can be seen in terms of the critical range of 60° to 90° valve opening being generally equally divided to each side of piston top dead center on the piston exhaust and suction stroke by reference to FIG. 5. The system of the present invention may be applied in conjunction with other exhaust gas purifying devices, for example, by conventional catalytic reactor, afterburner devices, etc. In this regard, the graph or plot of FIG. 5 is based on the employment of the present system in combination with a catalytic converter which is located downstream of the secondary air supply means within the exhaust manifold 5. With the catalytic converter being operated in conjunction therewith, it may be readily appreciated that minimum emissions occur for a valve overlap in the range of 60° to 90°, but thereafter while the NOX emissions decrease and the CO emissions remain about the same, the hydrocarbons increase dramatically above 90° and approaching 100° valve-overlap.

When the valve overlap period is less than 60°, the time area of communication between the intake passage and the exhaust passage decreases rapidly with decreasing valve over-lap and therefore the amount of secondary air and/or exhaust gas which can be drawn back into the primary combustion chamber and the amount of exhaust gas and secondary air mixture which can be drawn back into the intake manifold also decreases rapidly with decreasing valve over-lap. On the other hand, when the valve overlap is greater than 90°, the time area of communication between the intake passage and the exhaust passage becomes so large that;

1. particularly at engine full open condition, the exhaust gas emission of hydrocarbons rapidly increases due to increase of bypassing fresh air and fuel mixture; and
2. at idle speed and at low engine loads, the amount of trapped exhaust gas increases to cause the occurrence of misfire, as a result of not only increasing hydrocarbon emissions but also decreasing engine performance and increasing engine noises instead of high operating performance at high speed. This operation is contrary to social demand.

Reference to FIG. 2 shows the considerable difference between the time area resulting from the valve overlap between the normal valve lift curves shown in solid lines in contrast to the dotted line curves for an engine where the valve overlap to each side of top dead center is relatively small. The area between the intersecting lines b b and the base line is much greater for the valve overlap of the present invention, and it is this time period times the valve lift dimension which effectively determines the amount of exhaust gas and secondary air that can enter the combustion chamber, flow through the cylinder and back into the intake passage. The comparison of the dotted line plot against a solid line plot of FIG. 2 graphically illustrates the fact that not only is the time period too short below 60° valve overlap to produce the desired result, but that the volume of exhaust gas and secondary air which may possibly flow back through the exhaust valve into the cylinder as determined by the valve lift contribution of that area plot, is markedly reduced at overlap angles less than 60°.

The lower the load on the engine, the greater the negative pressure in the exhaust gas passage, and accordingly, the lower the load and the lower the engine speed, the greater the supply amount of secondary air which occurs as a result of aspiration due to the negative pressure in the exhaust manifold, and the longer the valve-overlapping period, the greater is the supply of the secondary air. Thus, engines having the means for supplying secondary air in terms of the present invention are extremely effective in reducing the injurious components contained in the exhaust gas. However, in other periods, generally the pressure in the exhaust gas passage is positive, as at full load, and the check valve 2 must be provided within the conduit in order to prevent the counterflow of exhaust gas through the nozzle and to the secondary air supply. The reason why the primary combustion is improved in the system of the present invention is described hereinafter in detail.

The mixture of the secondary air supply into the exhaust passage and the exhaust gas flows backwards across the combustion chamber 16 into the intake passage 20 because the negative pressure in the intake passage of the engine extends due to the extended valve overlap to the exhaust passage for a sufficient time because of the long overlap period and because the counterflow is unaffected by piston movement at this time. The mixture is therefore subjected to recombustion within the combustion chamber of the engine together with the fresh mixture which has been preheated by contact of the mixture of the exhaust gas, and the secondary air with the fresh air and fuel mixture in the intake passage, this function taking the designation E. G. R. (Exhaust Gas Recirculation). In addition to this, the mixture contains a large amount of secondary air which is heated by the exhaust passage and being at a high temperature functions to dilute the moderately the fresh mixture of fuel and primary air supplied to the intake passage of the engine and to heat the fresh mixture prior to introduction into the combustion chamber with the result that the thus diluted and heated mixture is easily ignited. These effects are never obtained in the case of taking in a lean mixture through the carburetor.

Moreover, at the end of the exhaust stroke, the fresh mixture taken in from the intake passage of the engine tends to concentrate in the neighborhood of the spark plugs, since the exhaust gas stays in a place along the upper surface of the piston. As a result of this, stratified combustion occurs.

It should be understood from the foregoing description that the system of the present invention employs a valve overlapping period for the engine which is considerably long and which occurs at a time when the piston is hardly moving (approaching top dead center and receding therefrom), supplies secondary air to the exhaust gas passage (by means of a check valve) when the pressure in the exhaust gas passage becomes negative by the effect of the negative air intake passage pressure being open to the exhaust passage which results in purifying of the exhaust gas of the engine in comparison with a conventional engine and having advantages over the conventional engine which may in fact use an air pump for supplying secondary air to the exhaust gas as a purifying device.

Thus, the system of the present invention provides the engine with the same effect as a gas purifying system which uses an air pump for supplying secondary air under pressure to the exhaust gas passage and in addition, insures the prompt preheating of the incoming fresh air and fuel mixture in the intake passage in contrast to those systems which employ suction pressure of a descending piston to move secondary air and exhaust gas into the combustion chamber, with the exhaust valve alone open to the cylinder, to improve emission control.

While the system is described in conjunction with cylinder 10 of the internal combustion engine of FIG. 1, in the multi-cylinder engine shown, the cylinders are commonly connected by way of an intake manifold to maintain a negative average static pressure within each cylinder intake passage, adjacent the intake valve.

What is claimed is:

1. A system for purifying the exhaust gas of a spark ignition type, four stroke multi-cylinder internal combustion engine, said engine including: intake and exhaust valves within intake and exhaust passages respectively for each cylinder for controlling the fuel-air mixture and exhaust gas to and from the engine cylinder, respectively, said system comprising:

secondary air supply means, means for providing a valve-overlapping period at the end of the exhaust stroke for the intake and exhaust valves of respective cylinders extending from 60° to 90° of crank angle and divided generally equally to each side of piston top dead center so that the pressure in the exhaust gas passage of the engine for said cylinders becomes negative during said valve overlapping period, to cause the negative pressure in the intake passage to such secondary air and exhaust gas from the exhaust passage through the cylinder into the intake passage, and means for supplying said secondary air to the exhaust gas passage of the engine when the pressure in the exhaust gas passage is lower than atmospheric pressure during said valve-overlapping period, whereby; the exhaust gas in the exhaust passage flows backwards across the combustion chamber and into the intake passage of the engine together with secondary air and the mixture of the exhaust gas and the secondary air is first subjected to mixing with the primary air and fuel mixture in the intake passage to preheat the primary air and fuel mixture and is secondly subjected to recombustion within the combustion chamber of the engine together with the preheated, fresh mixture of fuel and primary air.

2. The system as claimed in claim 1, wherein; said means for supplying secondary air comprises an air conduit for each cylinder, having a discharge end provided within the exhaust passage, near the exhaust valve and acting as a secondary air discharge port, and the other end opens to the clean air side of the air cleaner of the engine, and a check valve is provided within said air conduit to prevent gas flow therein, from said exhaust passage to said air cleaner.

* * * * *